(12) United States Patent
Elmi

(10) Patent No.: US 10,426,271 B2
(45) Date of Patent: Oct. 1, 2019

(54) SUPPORT APPARATUS, SUCH AS A SEAT, FOLDABLE AND PORTABLE

(71) Applicant: PELLEOSSA S.R.L., Massa (IT)

(72) Inventor: Paolo Elmi, Massa (IT)

(73) Assignee: PELLEOSSA S.R.L., Massa (IT)

( * ) Notice: Subject to any disclaimer, the term of this patent is extended or adjusted under 35 U.S.C. 154(b) by 0 days.

(21) Appl. No.: 15/547,689

(22) PCT Filed: Feb. 17, 2016

(86) PCT No.: PCT/IB2016/050834
§ 371 (c)(1),
(2) Date: Jul. 31, 2017

(87) PCT Pub. No.: WO2016/135586
PCT Pub. Date: Sep. 1, 2016

(65) Prior Publication Data
US 2018/0035815 A1    Feb. 8, 2018

(30) Foreign Application Priority Data
Feb. 24, 2015    (IT) .................. FI2015A0043

(51) Int. Cl.
*A47C 9/10*    (2006.01)
*A47C 4/28*    (2006.01)
(Continued)

(52) U.S. Cl.
CPC ............ *A47C 9/105* (2013.01); *A45F 3/24* (2013.01); *A47C 4/286* (2013.01); *A47C 13/00* (2013.01); *A47C 17/64* (2013.01); *F16M 11/38* (2013.01)

(58) Field of Classification Search
CPC ........... A47C 9/105; A47C 3/24; A47C 13/00; A47C 17/64; A47C 4/268; F16M 11/38
(Continued)

(56) References Cited

U.S. PATENT DOCUMENTS 564,129  A  *  7/1896  Wade
882,468  A  *  3/1908  Huebner et al.
(Continued)

FOREIGN PATENT DOCUMENTS

DE          389653 C      2/1924
GB        191106468 A     6/1911

OTHER PUBLICATIONS

International Search Report and Written Opinion for International Application No. PCT/IB2016/050834 (10 Pages) (May 23, 2016).

*Primary Examiner* — Tan Le
(74) *Attorney, Agent, or Firm* — Lucas & Mercanti, LLP

(57) ABSTRACT

A supporting apparatus such as a portable seat that can be opened and closed is disclosed having a plurality of poles hinged to junctions. A part of the poles form the legs and another portion form an anchorage on which a foldable surface is stretched when the apparatus is opened. The apparatus also includes traction elements cooperating with the folding surface and which join one another at the end of the poles that do not converge at the junctions. The configuration preset by the orientation of the poles, along with the structural configuration of anti-prism or other extremely stable and rigid configurations, are such that they spread most of the torsional and bending stresses.

16 Claims, 16 Drawing Sheets

(51) Int. Cl.
*A47B 3/00* (2006.01)
*A45F 3/24* (2006.01)
*A47C 13/00* (2006.01)
*A47C 17/64* (2006.01)
*F16M 11/38* (2006.01)

(58) Field of Classification Search
USPC .................. 248/431, 435, 166, 188.6, 155.3; 297/16.2, 461, 440.11, 452.13; 108/128
See application file for complete search history.

(56) References Cited

U.S. PATENT DOCUMENTS

| | | | | |
|---|---|---|---|---|
| 1,188,500 | A * | 6/1916 | Fsinnnnons | A47C 9/00 108/128 |
| 2,139,673 | A | 12/1938 | Draper | |
| 2,604,932 | A * | 7/1952 | Leggett | A47B 3/00 108/128 |
| 2,713,529 | A | 7/1955 | Herrschaft | |
| 4,290,643 | A | 9/1981 | Logan | |
| 9,402,467 | B2 * | 8/2016 | Baoqing | A47B 3/02 |
| 10,149,545 | B2 * | 12/2018 | Bergling | A47C 4/286 |

\* cited by examiner

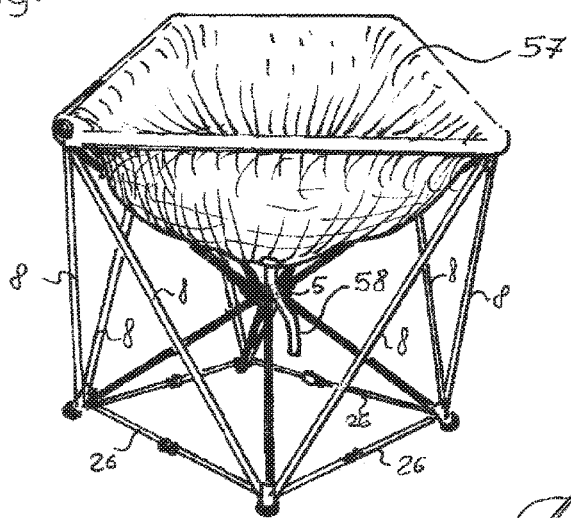
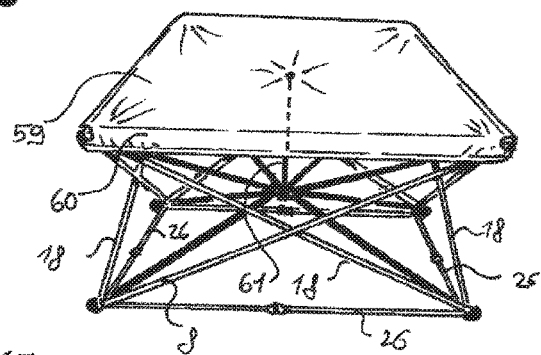
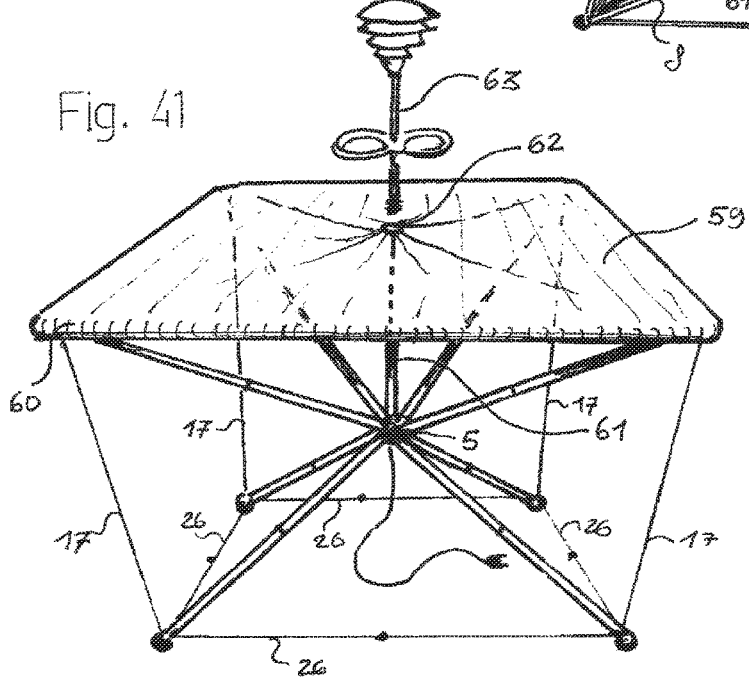

SUPPORT APPARATUS, SUCH AS A SEAT, FOLDABLE AND PORTABLE

CROSS-REFERENCE TO RELATED APPLICATIONS

This application is a 371 of PCT/IB2016/050834, filed Feb. 17, 2016, which claims the benefit of Italian Patent Application No. FI2015A000043, filed Feb. 24, 2015.

TECHNICAL FIELD

The present invention concerns the technical field of folding and portable supporting apparatuses, such as stands, seats, tables, hammocks, folding beds, camping beds and all the structures that are mainly but not exclusively suitable for camping, hiking, outdoor activities, trips and as equipment for emergency camps. All the situations where lightness, easy opening and folding, as well as the minimum amount of space in closing phase, are decisive for their use. In particular the invention concerns an innovative group of supporting apparatuses that are extremely lighter, more comfortable and more solid than commercial ones.

BACKGROUND ART

The structures of most of the commercial supporting apparatuses, which can be folded in compact bundle, are articulated with poles, hinge and supporting textile apparatuses at times cooperating, such as the popular crossed style chairs, whose infinite variations are available FIG. 1. Their weight is on average from 2.5 to 4 kilograms and derives from thousand-year old structural models.

A version of three-legged camping stool FIG. 2 is composed of three poles joined on the upper part on the extremes to a piece of fabric, a hinge on three axes, in the middle of the poles ending on the ground without other constraints. Essentially this structural diagram copies the same structure of the seat of FIG. 1 wherein most of the elements of the frame are heavily strained by bending (1), shearing and torsional stresses. The consequence is a high materials expense compared to the unit of sustained weight. So these models are very heavy or very fragile or result quite low.

Furthermore the big dimensions of the materials involve high weight and significant volumetric encumbrances, therefore these objects neither are "pocket size" nor are "portable" meant as the possibility of storing them in a small rucksack or in a small bag. Many of these apparatuses are at most "transportable" that means they can be folded and stored in a car boot or they can be carried over one's shoulder for a short way. An example of the limits of these apparatuses is given by a tiny stool FIG. 3 that is only 8 or 9-inch high and has a coplanar closure of joined elements of traction (2) which are adjustable by a hook with the possibility of pre-tightening. Most of the elements of the structure are composed of full iron and compression exposes them to different strains. This microchair weighs a little less than one kilogram anyway, and has a limited functionality.

An American patent made by A. F. Draper in 1938 (U.S. Pat. No. 2,139,673) FIG. 4 probably didn't commercially succeed, but significantly improves the structural economy of foldable objects: a metal structure, in any case heavy because of the technological limits of the time. A polyhedral shell of means of traction composed of different materials contains the structure. Eight poles converging to a central junction hinge in pair and to every pole going up, corresponds another one going down.

Draper's seat structure not only has a doubtful effectiveness and complicated mechanics, but also has a significant problem: the shell of the means of traction strains all parts of the apparatus in the right way, but the four side tensioners are put under stress, in case of torsion between the supporting surface (3) and the one on the ground (4), only when the supporting surface has begun to rotate and the upper and lower extremes of the side means of traction move away one another. This effect makes the seat unstable and damages the hinges, because the stresses they are subjected to are not orthogonal to the angles of their pins, so the torsion damages the poles.

Regarding commercial foldable camping beds, the ratio of volume to maximum loading is even more significant: the average weight of these apparatuses, in order to hold a person who weighs 80 kilograms, is about 5 kilograms. In case of folding or detachable hammock stands, it raises at least to 12 kilograms. These weights discourage people carrying these apparatuses without using a means of transport. It is still a question of structures composed of elements that are exposed to great leverages and high torsional stress.

Advantageous Effects of Invention

The aim of this invention is to provide a new structural base and some innovative solutions which enable to significantly reduce the weight and the encumbrance of some currently in use folding supporting apparatuses such as: supports, stands, seats, tables, camping beds and hammock stands for outdoor use and camping. According to claim 1, it is described a series of structural elements that are symbiotic with other specific technical solutions and enable to realize apparatuses on average five times lighter and about five times less bulky than the currently used ones. By copying a structure that is common in many vertebrates and other natural organisms, the invention is realized by making an inner skeleton mainly composed of compressed elements and an external shell of tensors, mainly stressed while in traction and adding to this so to say "natural" apparatus a series of applications and technical solutions that enable to realize apparatuses useful for the desired function. Moreover, the aim of the present invention is to realize the said apparatuses with the best solutions regarding ergonomics, easiness of use, stability, and to realize them with the available technology and materials, and with the best ratio between weight capacity and the weight/encumbrances of the object.

For two-legged seats FIG. 5, three-legged seats FIG. 6 or more legs; for tables FIG. 40 and FIG. 41 them as well equipped with a varying number of legs as the supports of different functions such as high chairs FIG. 38 or pelvic supports FIG. 39 it is used a structure composed of an inner skeleton made of tubes or poles that converge on a central horizontal junction. This junction hinges an end of the said poles and its polygonal sides are the pins of the said hinges; from this junction, when the structure is unfolded and in use, the poles are set one upwards and one downwards, in cyclic way, in a varying number of pairs as in FIG. 9, arranged as an anti-prism. In these apparatuses, according to the invention, the structures is completed by a "shell" that is a closed system of means of traction which are composed of materials flexible to transverse stresses such as cables, ropes, bands, fabrics and laminas. The said means of traction join all the poles vertexes opposite to the central junction so as to each vertex joins at least other three vertexes of the other poles creating this apparatus of "shell" made of tie-straps that provides a stable constraint for all constituent parts. The whole system works as a closed tensile structure. In the upper part, the means of traction are composed of textile surfaces or at least flexible ones that serves as support for people or objects and are integral part for the means of traction. As all the components of this structure are spared from almost every stresses caused by bending, torsioning, shearing, the result are extremely rigid and solid apparatuses using the least amount of raw materials.

In unfolding/folding phase of the apparatus, it is possible to stop or lengthen the bonds of a certain number of means of traction in order to relax the whole structure and then fold all elements, including the supporting surfaces of the structure, in parallel, ordered, compact bundle FIG. 13 and FIG. 16. As in the technique of sails or medical corsets, it is possible to join to the supporting surfaces of the seats some flexible surfaces (14) reinforced with thin and semi rigid sticks (15) to obtain folding backrests; these surfaces are spread by the sticks when in use, but they are supported by the user's back and are flexibly joined to the side edge of the supporting surfaces. In a similar way, for some seats are provided expansions (16) of the supporting surfaces over the polygonal limit given by the vertex of poles. The said expansions are supported in a similar way on the backrests by sticks (15) that are coplanar integrated in the same supporting surface. According to claim 1, it is an optimal solution the partial rotation of the polygonal supporting surface of the seats with respect to the polygon of the base FIG. 4; this shape of the frame and of the means of traction dictates a tetrahedral shape to the two-legged seats/supporting surface FIG. 5 and a similar anti-prismatic shape to the seats with a higher number of poles. The said anti-prismatic shape is extremely rigid and minimizes movements and distortions of the apparatus when under load. In case of not dynamic load, as for the case of the tables FIG. 40 and FIG. 41 it is possible to use alternatively a prismatic structure with only one side tensioner (17) per pole: FIG. 17; or crossing means of traction (18), as in diagram of FIG. 18 wherein the poles are joined on vertical planes in pairs as in the geometry of prism, that is with the 3 edges of the upper supporting surface polygon parallel to the base polygon, in this case the hinges of the poles with the junction are joined one on the other in order to simplify the closure. For camping beds apparatuses FIG. 46 and for hammocks stands ones FIG. 42, structural principles are the same, but there are two junctions (64). They are vertically oriented and are spaced out by a horizontal pole; the hinges are similar to a bone joint as in the femoral head, in order to have more movement directions and to give more elasticity to the structure.

These apparatuses are closed in the same way of the ones of the seats, by loosening the hooks and by loosening one or more of the means of traction under the structure, but in order to have more stability the directrixes of these tie straps also involve the point of contact among the junctions and the central pole that joins them. Concerning these two apparatuses, only a part of the anti-prismatic configuration of the means of traction takes form, but the torsion on the longitudinal axis of the apparatus is blocked by ground contact of the feet. The poles of these quite big folding apparatuses can be sectioned or halved, with proper links connected, in order to reduce these structures and make them more portable when closed. All the apparatuses subject-matter of the present invention have spread and hardly tightened supporting surfaces that result more comfortable than the currently used ones which are often only constrained and tend to bundle up the users' body. Further advantages are deducible by the subordinate claims.

BRIEF DESCRIPTION OF DRAWINGS

According to the invention, further features and advantages of the present supporting apparatuses result clearer through the following description of some realized shapes, made by way of example but not limitation, referring to the attached drawings, wherein:

FIG. 39 shows an apparatus wherein the upper surface cooperate only on the perimeter with the means of traction, but falls into the structure with the function of a sink or a washstand.

FIG. 40 shows a small table with crisscrossing means of traction.

FIG. 41 shows a version of a four-legged table with tightened upper surface and central support avoiding the structure to fall into itself.

EXAMPLES

Figure 1:
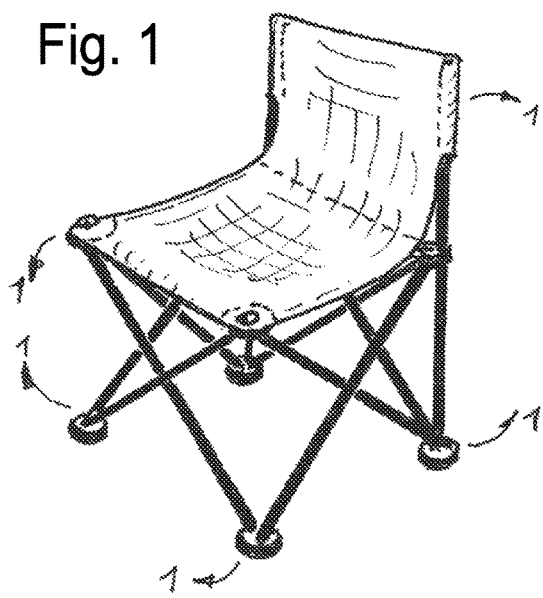
FIG. 1 shows the typical commercial chair with criss-cross frame.
Figure 2:
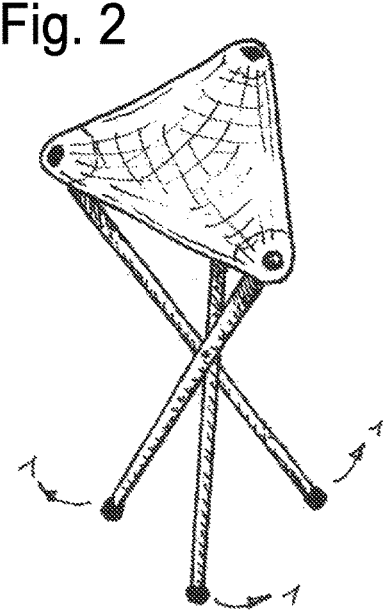
FIG. 2 shows a three-legged stool that has been produced since many years, whose poles are subject to intense bends and torsions.
Figure 3:
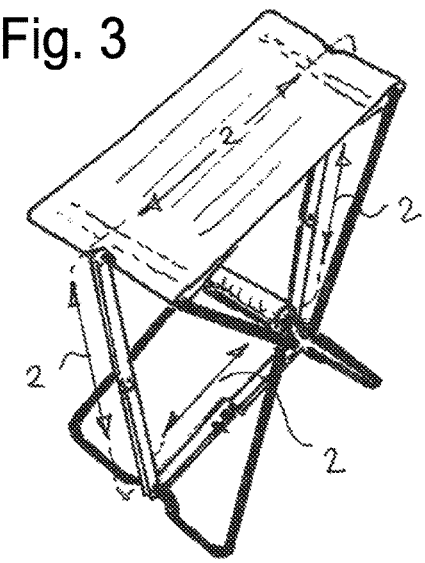
FIG. 3 shows a micro-stool sold as pocket size, wherein a coplanar ring of means of traction only partially stabilizes the structure.
Figure 4:
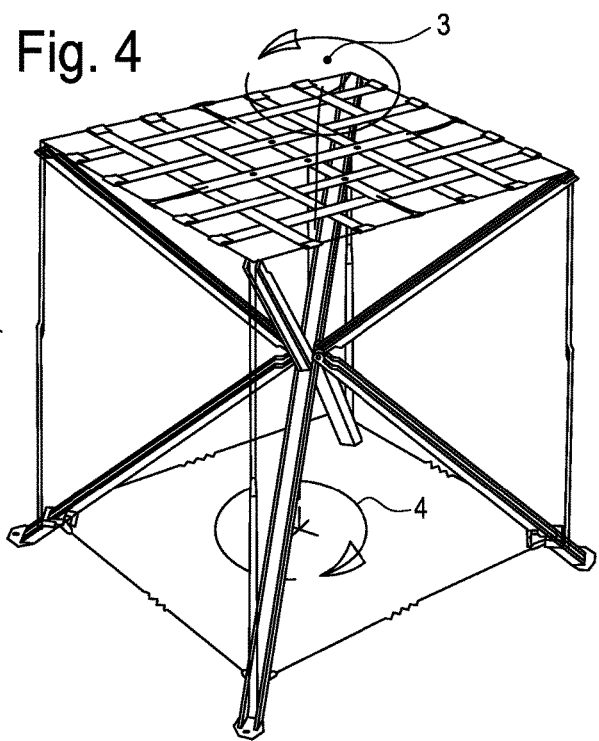
FIG. 4 shows Draper's patent of the seat equipped with a shell of means of traction complete but without a good torsioning strength.

As set forth in the next part of the present description, the primary concept of the invention can be extended to object meant for different functions, but which are all foldable supporting structures for people or objects. In the specific instance the concept of the present invention not only enable to make chairs, but also to make stands, tables, folding beds and others similar items. The said particular examples are not exclusive, those solutions referring to the attached drawings concerning the case of a chair, are not to be meant with a restrictive sense but they can be widen to other apparatuses. In general, the invention concerns the innovative use for these supporting apparatuses of an unusual structural principle and of some further technical applications, which enable to easily use and fold these apparatuses. In the sample four-legged chair presented in FIG. 7, when in use, a central junction (5) hinges the ends of the four poles pointing downwards (7) and of those pointing upwards (6). The ends of the poles (22), oriented upwards and opposite to the junction, are joined to the vertexes of a polygonal surface made of textile or the like material, (13) which represents the seat of the chair. The said vertexes are joined through proper links (23) to some side means of traction (24) that can be composed of extended surfaces as in FIG. 19 or of linear elements as: ropes, cables, bands or laminas.

These means of traction are here set in the optimal conformation, two directions that starting from the vertexes of the supporting surface, branch off joining two different links (25) placed on the ends of the four poles oriented downwards. All the legs of the chair are still further joined one another parallel to the ground by other means of traction (26), which are placed in the lower part of the structure and complete the closure of the "shell" of means of traction that includes the structure of the poles. The elimination of the most bending, shearing and torsional stresses from this structure enables to economize on the dimensioning of materials and it is the distinguishing feature of this invention.

Figure 9:
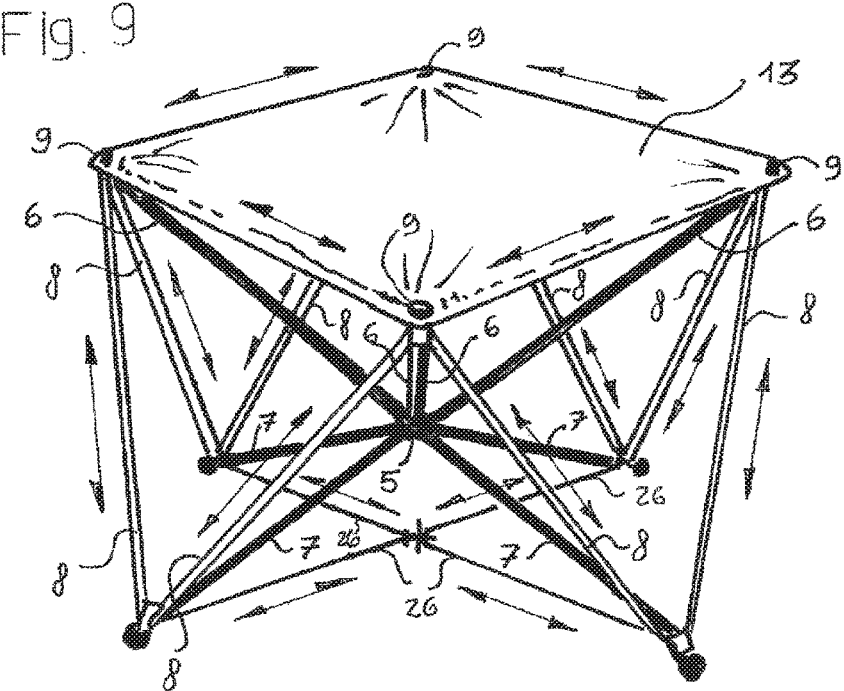
FIG. 9 highlights in a four-legged seat the elementary diagram of an antiprismatic structure of the side supporting means.
Figure 10:
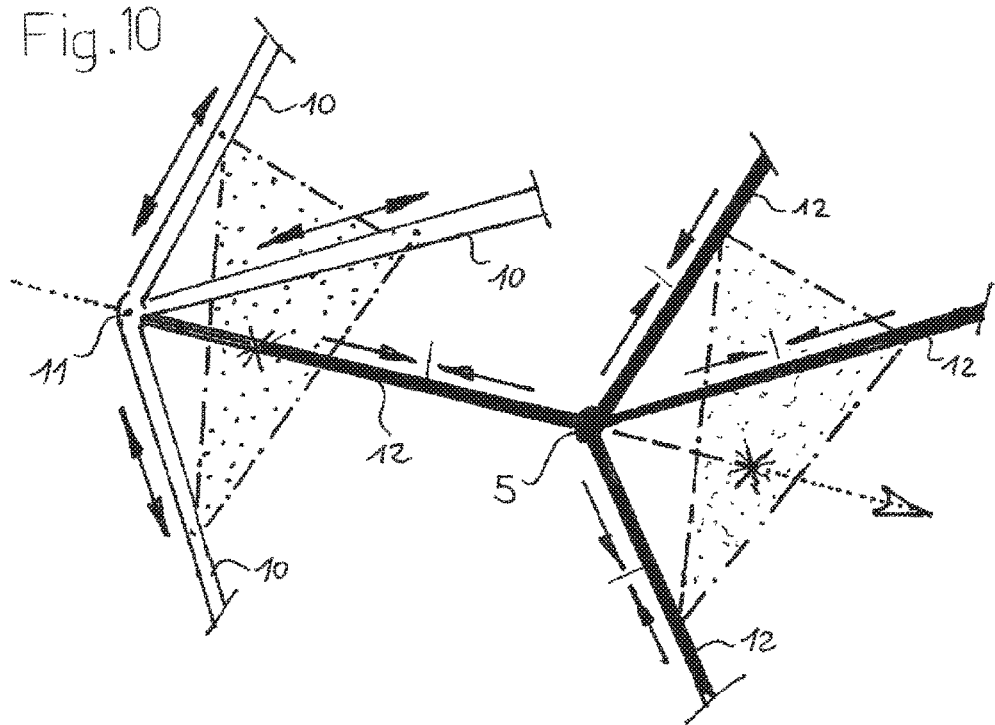
FIG. 10 shows the static diagram with the minimum of elements which enables all the apparatuses to become rigid and without elements subject to harmful forces.
Figure 11:
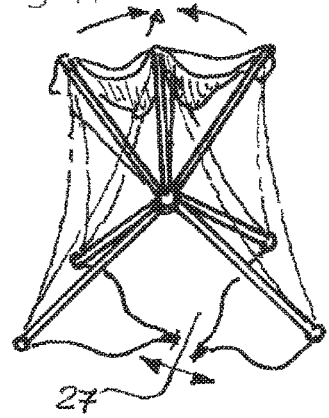
FIG. 11, FIG. 12, FIG. 13 show an example of folding of the apparatus after loosening the means of traction.
Figure 12:
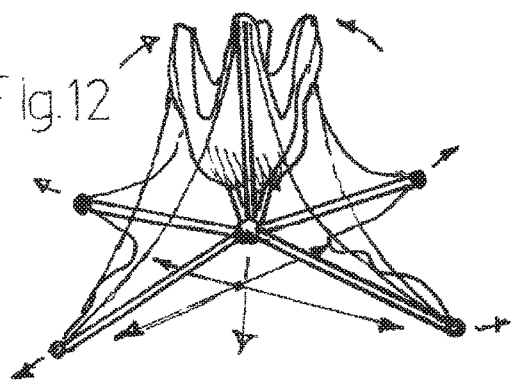
Figure 13:
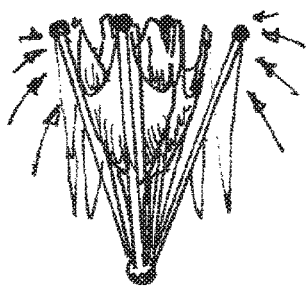
Figure 14:
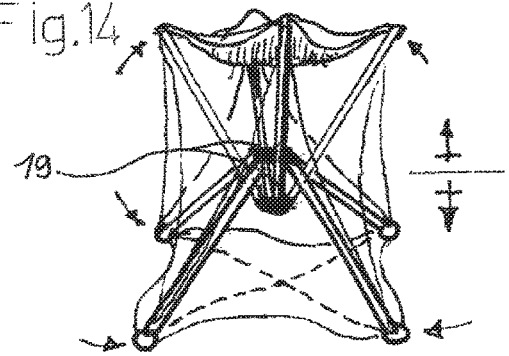
FIG. 14, FIG. 15, FIG. 16 show an example of folding of the apparatuses with the central junction divided into two elements in pair.
Figure 15:
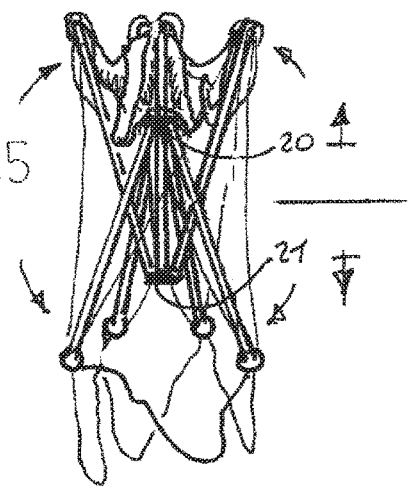
Figure 16:
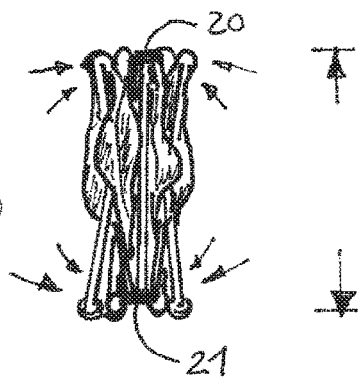
Figure 19:
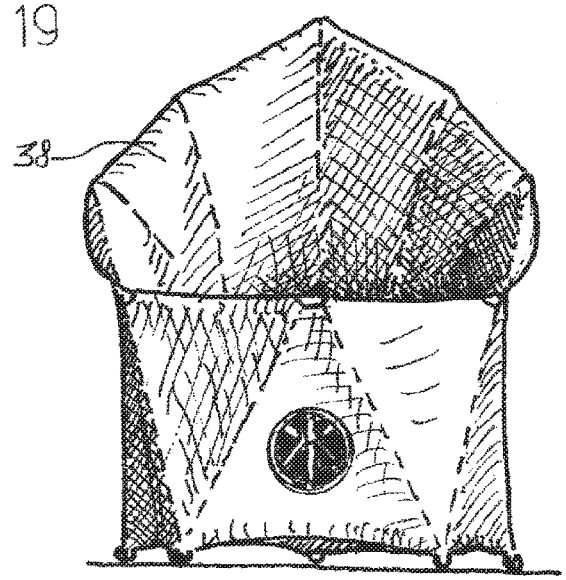
FIG. 19 shows an apparatus wherein the side means of traction are not linear elements but interconnected surfaces.
Figure 20:
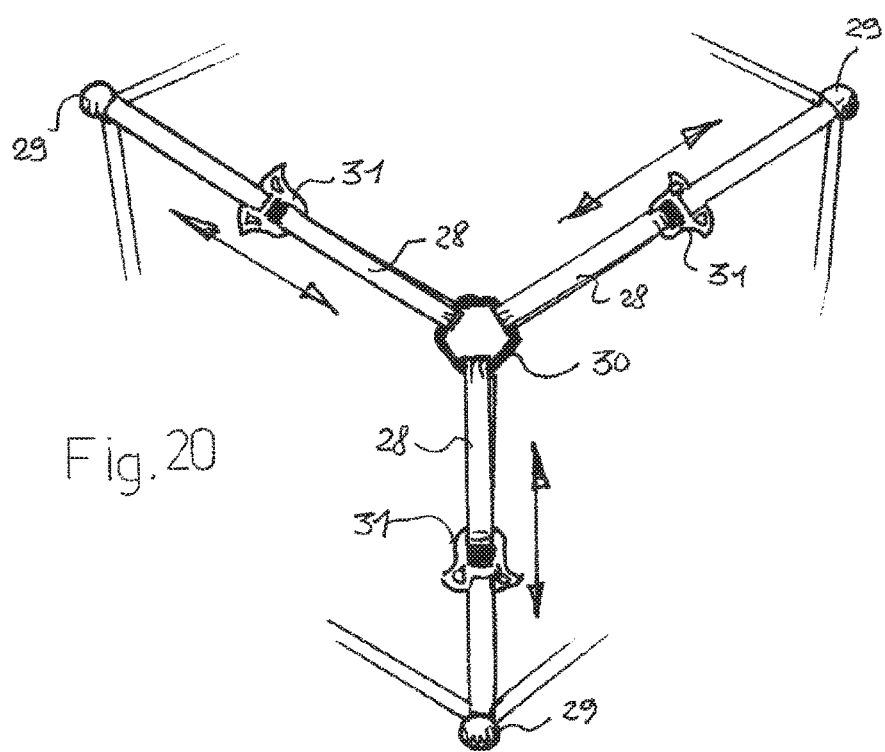
FIG. 20 shows a particular e not exclusive arrangement of tightening/loosening of the means of traction under a three-legged apparatus.
Figure 21:
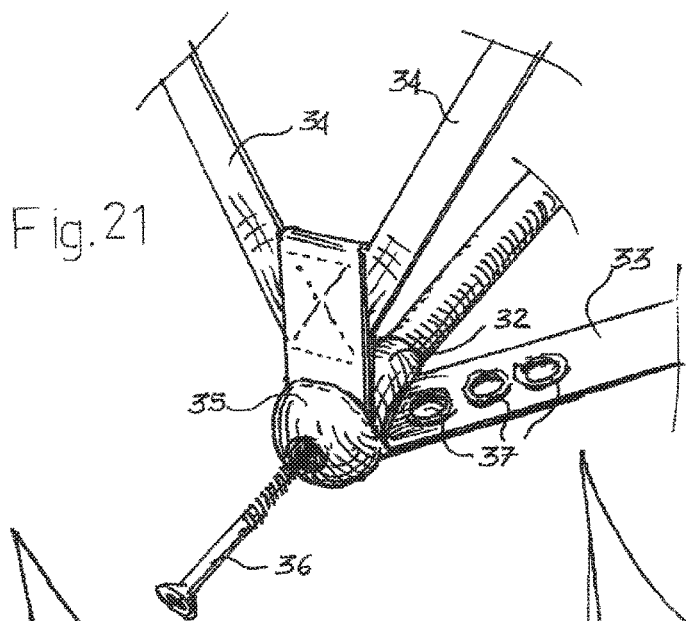
FIG. 21 shows a particular of the solution of the link among the means of traction and the feet of the apparatus, when the said means are composed of straps.
Figure 22:
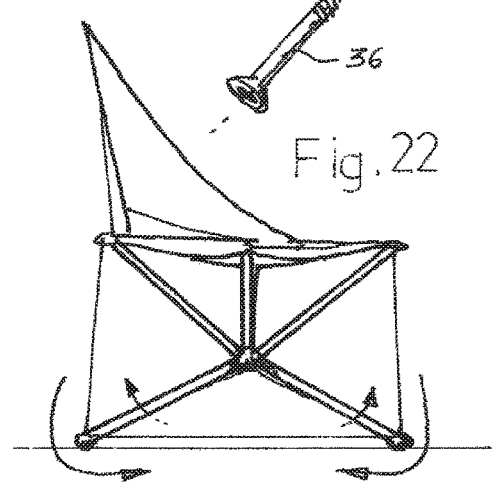
FIG. 22, FIG. 23, FIG. 24 show the effect of the height or inclination adjustment of the apparatuses, by sliding the linking among the means of traction and the lower ends of the poles.
Figure 23:
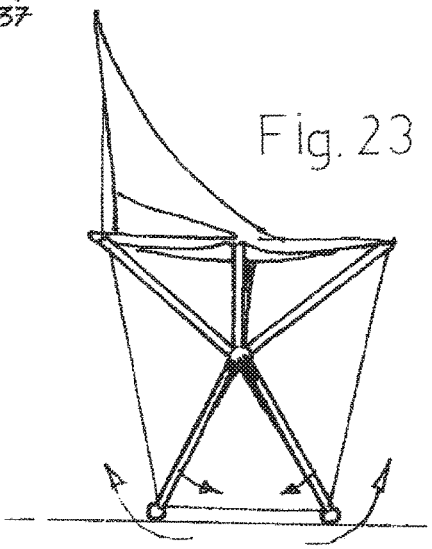
Figure 24:
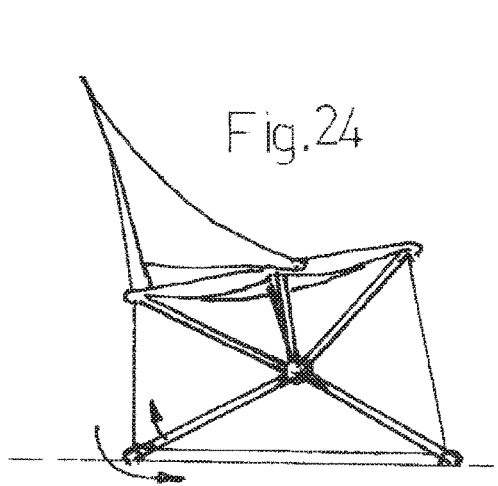
Figure 31:
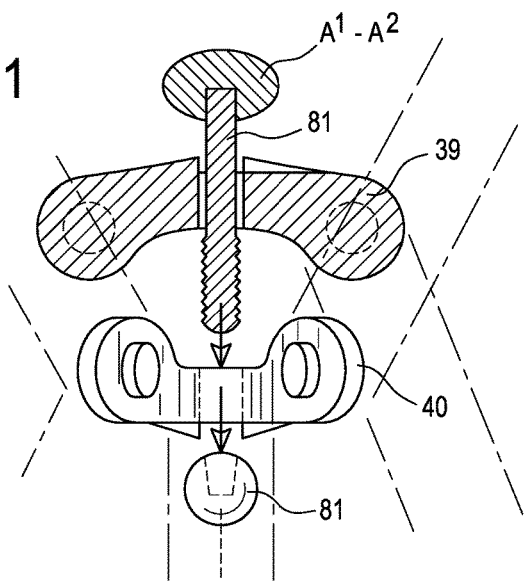
FIG. 31, FIG. 32 show a possible solution wherein the central junction is divided into two parts that can be moved away or joined in order to realize a special closing modality of the apparatuses realized in that manner.
Figure 32:
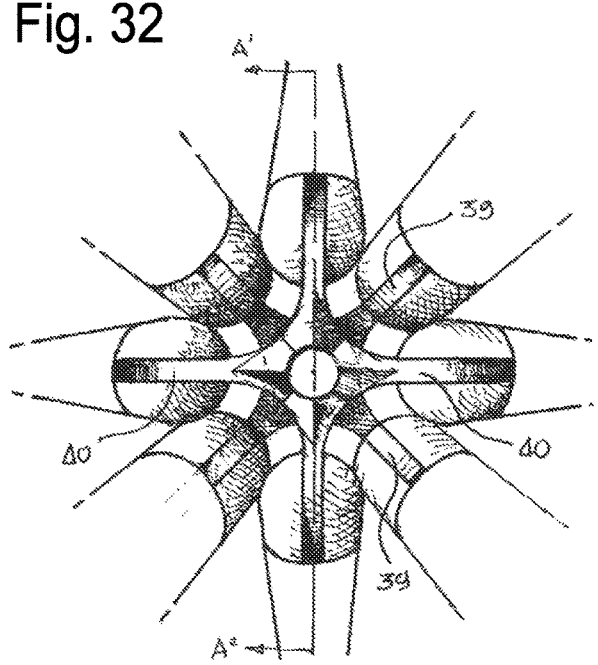

The whole structure is relaxed by releasing or lengthening of this means of traction placed in the lower part (27), and it can be easily folded in this way: FIGS. 11, 12, 13; all the poles remain joined to the central junction, in a bundle of parallel poles, which is possible to aligning the means of traction and, among them, the supporting surface. Parallely folding the elements of the apparatus it is possible to reach the maximum closure compactness and the maximum length of the closed structure corresponds to the exiguous and uniform length of the poles. FIG. 20 represents a particular closing/releasing process of the lower means of traction. For example, in a three-legged chair a group 4 of three bands or straps (28) joins the feet (29) to a polygonal ring (30), that is placed in a central position, which then goes back to the buckle (31); the said buckle can be pushed away from its central position in order to tighten the apparatus and, in the opposite direction, it can be slid toward the centre so as to relax the structure during the closing phase. In this not exclusive solution, the terminals of the poles on the ground FIG. 21 are preset to join them and are composed of three elements:—A small cup (32) that surrounds the poles or tube and expands so as to support the band of the lower means of traction (33) which then joins a pair of side means of traction (34).—A spherical cap (35) and a screw (36) that intersects all the elements which complete and compact the structure placed on the ground. The bands, which complete the lower part of the structure, are perforated where the screw pass through it, and these holes are reinforced by an eyelet (37); other eyeletted holes are placed some centimeters apart along this band and enable to choose some adjustment for height and inclination of the structure as schematized in FIGS. 22, 23 and 24. A particular arrangement of the poles around the junction is decisive for the stability of these apparatuses, that is the poles around the junction are linked or hinged in such a way as to each pole pointing upwards hinges between two pointing downwards, and the ones pointing downwards hinge between two pointing upwards. It serves to give the structure a stable anti-prismatic shape, as schematized in FIG. 9 wherein the polygon represented by the supporting surface of the seat is rotated of half side with respect to the polygonal base, which is delimited by the feet of the poles. In FIGS. 26, 27, 28, 29 and 30 seats are represented from above respectively provided with 2, 3, 4, 5, 6 pair of poles arranged in this way. The outer means of traction can be fully replaced, or the most of them, by a shell of flat surfaces joined one another and internally tightened by the previously described structure of poles and junctions, as represented in FIG. 19 wherein the frame with pentagonal anti-prismatic base extends and is braced by a textile covering. The backrest and the armrests as well are placed onto it supported by sticks (38). A particular shape of the central junction FIG. 31 and FIG. 32 has a junction divided into two parts, the first part (39) is placed onto the other and contains the hinges of the poles pointing downwards; the latter (40), placed under the first one, hinges the poles pointing upwards. Therefore, the poles of a series intersect with the ones of the other series, alternating. The two semi-junctions can be screwed by a screw joint (81) when are drawn up. In this phase the structure expands and tightens the shell of the means of traction. When the two junctions are released, they can be distanced until the poles of the two groups are gathered in a parallel bundle, as shown in the diagram of FIGS. 14, 15 and 16 wherein the two semi-junctions are set at the ends of the said bundle. This alternative structure as well has an anti-prismatic shape and opening or lengthening of the means of traction are not required as the structure of poles gathers up and reduces or expands outwards.

Figure 5:
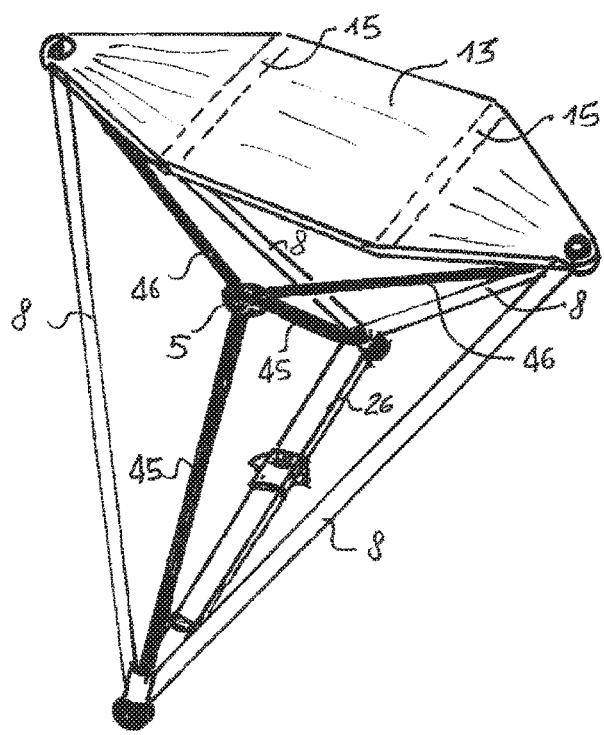
FIG. 5 shows according to the invention, a two-legged support that stands cooperating with the sitting user.
Figure 6:
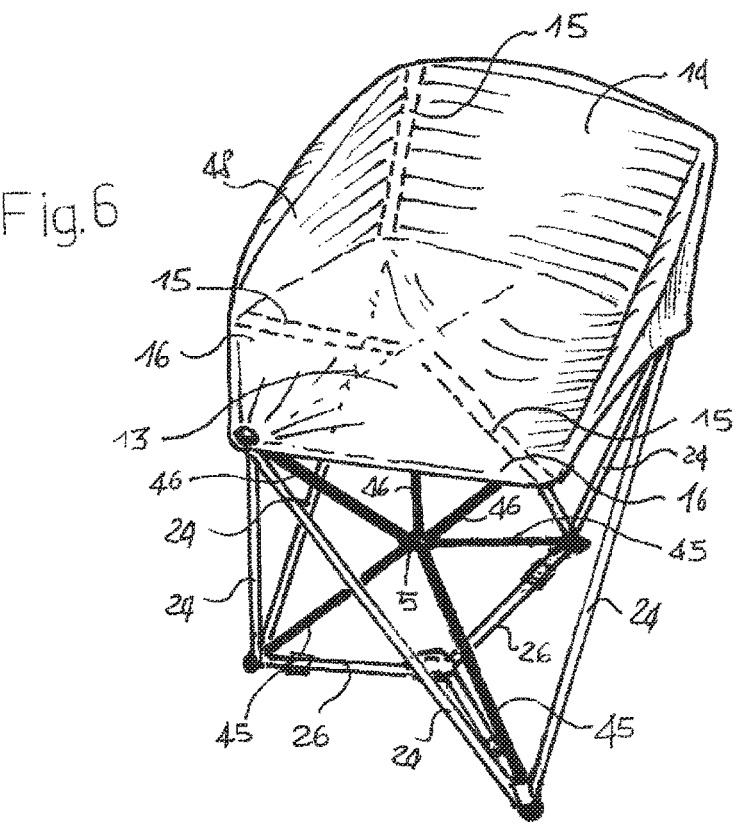
FIG. 6 shows a five-legged small armchair complete with foldable backrests.
Figure 7:
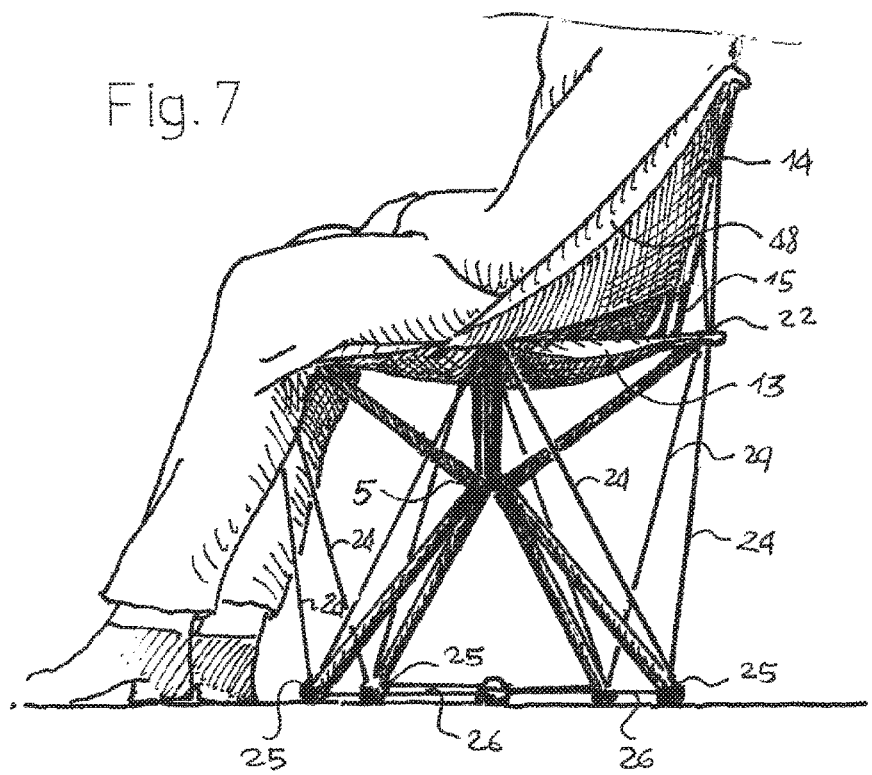
FIG. 7 shows a four-legged seat with all the significant elements of the structure.
Figure 8:
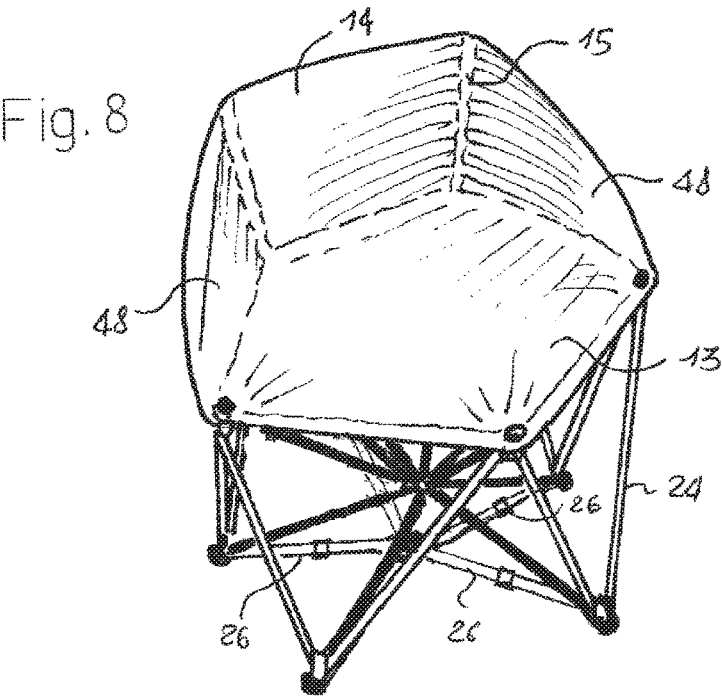
FIG. 8 shows a three-legged seat wherein the supporting expansions, provided with sticks, cooperate with the surface of the backrest, realizing a reciprocal support of the two elements.
Figure 17:
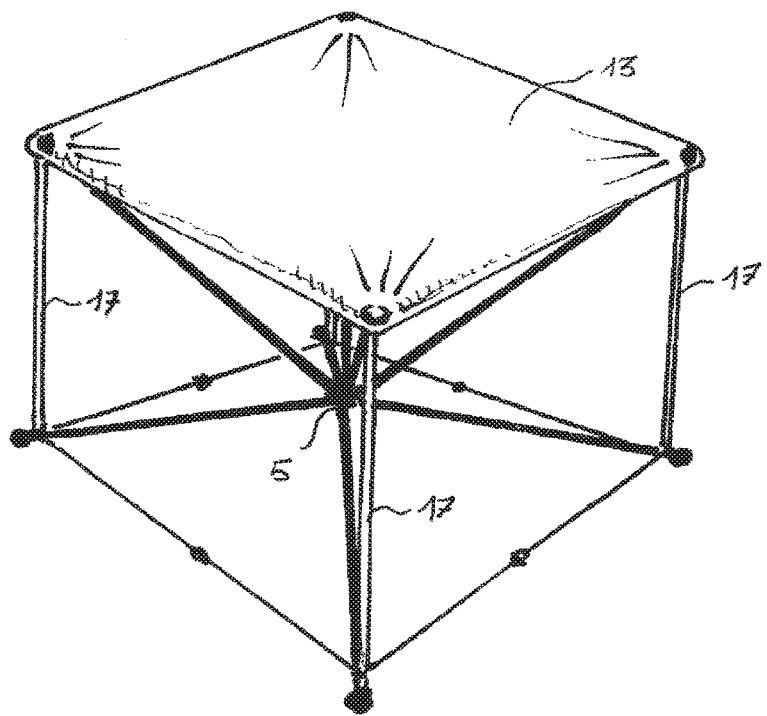
FIG. 17 highlights in a four-legged apparatus the elementary diagram of the prismatic supporting structure with only one side mean of traction per each pole holding the supporting surface.
Figure 18:
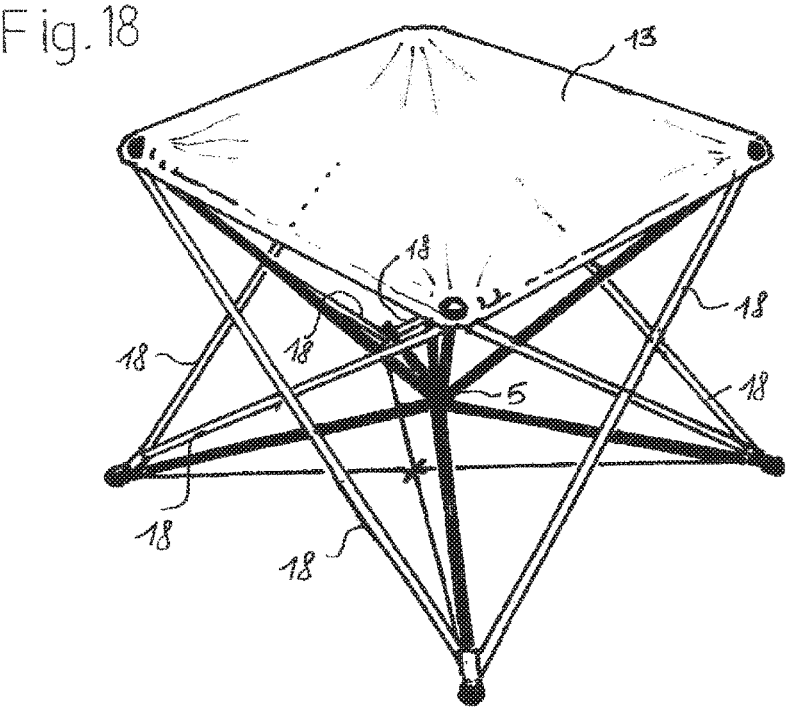
FIG. 18 shows in a four-legged apparatus, the elementary diagram of the prismatic supporting structure with two side means of traction per each pole that holds the supporting surface.
Figure 33:
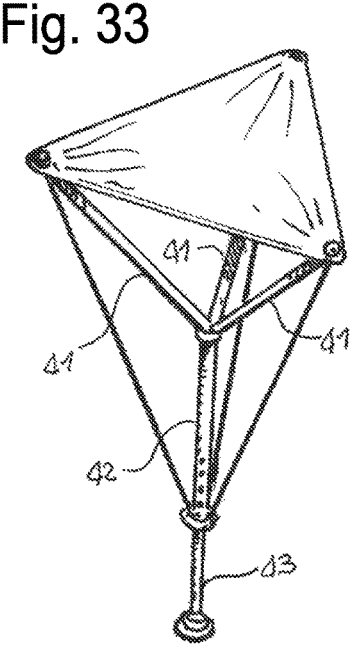
FIG. 33 shows a one-legged supporting apparatus and at least three poles joining to the supporting surface.
Figure 34:
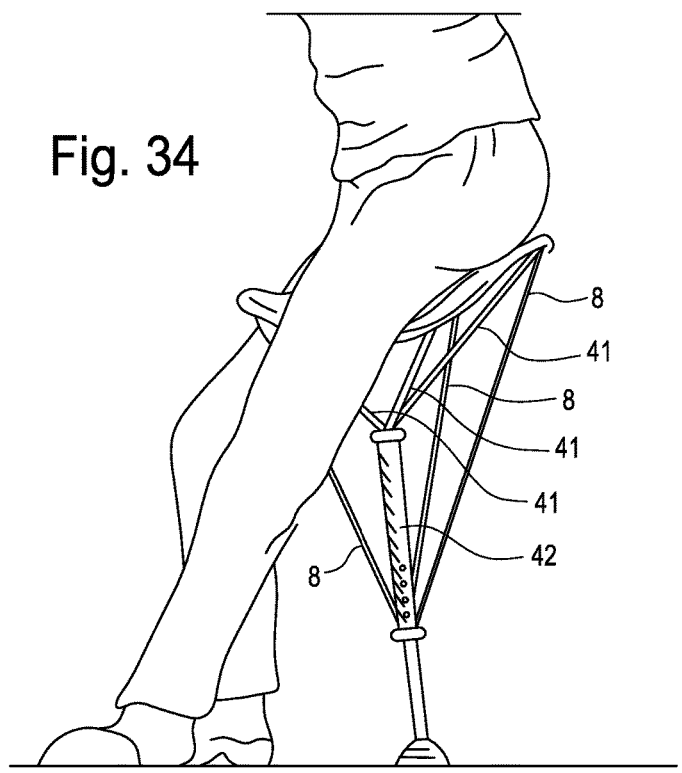
FIG. 34 shows the using modality of a two-legged tetrahedral seat.
Figure 35:
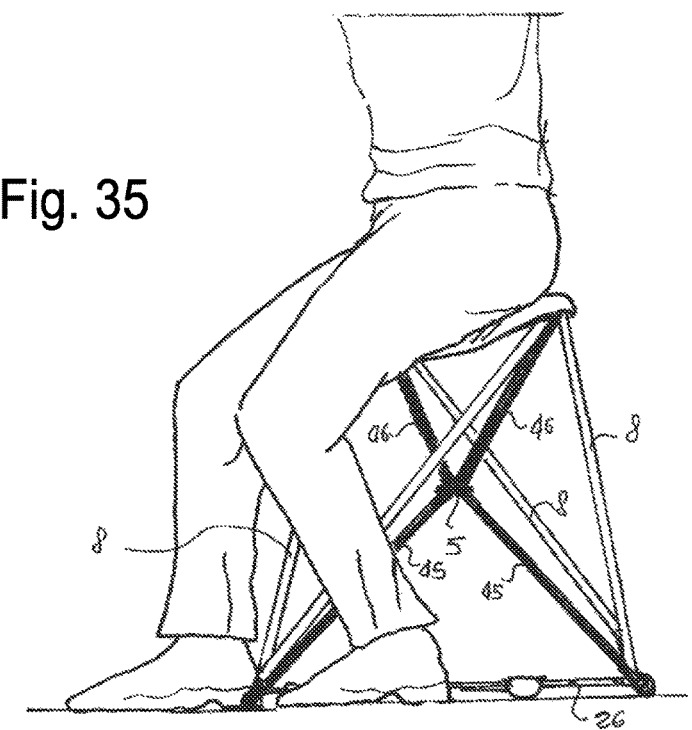
FIG. 35 shows the using modality of a seat provided with only one leg.

Other structures like the anti-prismatic one, but less rigid, can be chosen too. The diagrams of the means of traction which can be applied to the frame of these different apparatuses are schematized in FIG. 17 and in FIG. 18; furthermore mixed bracing systems for this models exist: In the seat support FIG. 33 with at least three poles pointing upwards (41) and only one pointing downwards (42) a structure which does not belong to the said models has been chosen, but also in this case there are not elements in the frame which are flexed or subjected to torsion. In this apparatus it is also possible to add an adjustable lengthening module (43), between the feet and the pole pointing downwards. This apparatus as well has a tetrahedron shape, as the one of FIG. 5. Also the support/seat shown in FIG. 5 has the minimum number of poles: two pointing downwards (45) alternating the two pointing upwards (46), and has the same shape and triangulation of the side means of traction of the other anti-prismatic seats. Furthermore, the supporting surface (13) is tightened by two links and is enlarged by adding one or more sticks (44). When in use FIG. 34 it combines with the sitting user's feet leant on the ground. The user's feet are placed orthogonally to the feet of the apparatus. This support as well is a tetrahedron, as the one of FIG. 33 wherein only one support is completed by leaning the user's feet on the ground. In FIGS. 27, 28, 29 and 30 there are some, not exclusive, diagrams concerning the positioning of the backrests (47) that can be added, or not, to the surfaces of these chairs. These backrests are constrained to the seats of the chairs and are combined as in orthopaedic corset by proper sticks (15); FIG. 7 shows one prospective of the solution of the four-legged chair. These backrests becomes stable only when the user lean his/her back on it. The sticks avoid the falling or sliding of the textile planes or the like which the backrests are made of, while the side bracing (48) of these surfaces completes their stability. In closing phase, these surfaces can be folded and aligned together with the other parts of the apparatus, also without disjoin them. In some apparatuses, as the one represented in FIG. 6, the structure of a seat on three-legged chair is composed of a backrest (14) supported by a pair of sticks (15) hinged to textile materials near the two ends of the joint between poles and surface of the seat, while two other sticks (16) enlarge the seat beyond the polygonal perimeter of its supports, in order to extend the small triangular supporting surface. When the user's legs lean on these extensions (16) the side supporting planes (48) of the backrest spread, finally tightening the backrest around the user's back.

Figure 36:
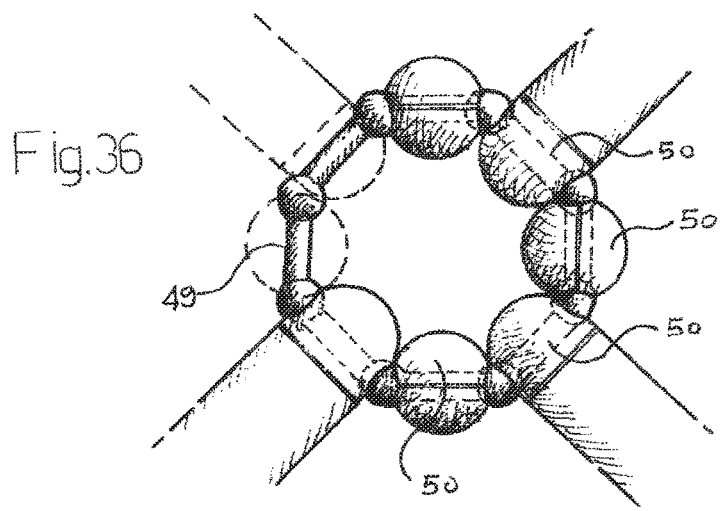
FIG. 36 and FIG. 37 show a solution wherein the central junction is composed of a polygonal ring. The heads made of plastic materials, of the tubes branching off from the said junction, turn around the sides of the said ring. The heads partially insert in the same tube.
Figure 37:
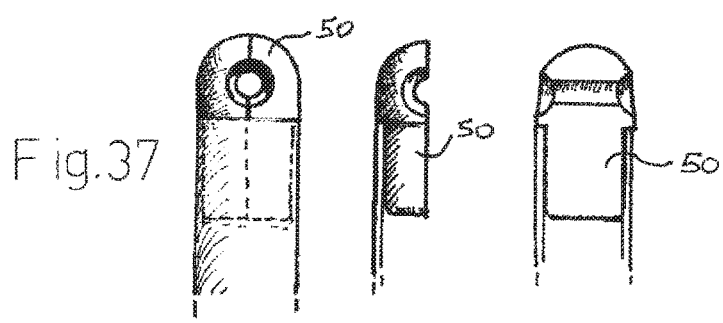

In a not exclusive solution, the junction that hinges the structure as antiprism FIG. 36 is shaped as a polygonal ring (49) made of metal or other firm materials. The circular section of its segments functions as hinge pin to proper heads (50) made of reinforced plastic material that join to the ends of the pole (that are shaped as little tubes in this version). On the vertexes of the polygonal ring are preset some small spheres (51) that reinforce the point where the ring is mainly put under stress and enlarge the friction area between the metal and the end of the pole FIG. 37 that are made of plastic materials. This friction make the junction stable, otherwise the junction could have an inclined or distorted position. This shape of the junction enables to tighter gather the poles without spaces among them.

Figure 25:
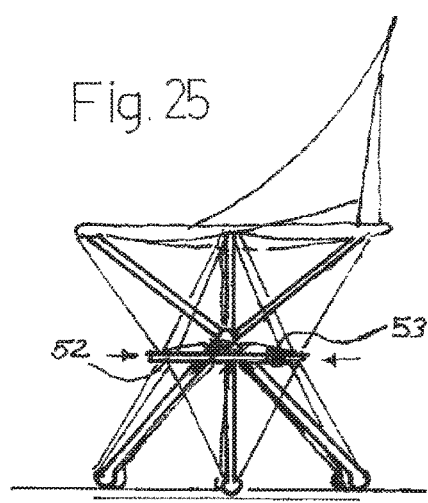
FIG. 25 shows a secondary tightening system of the side means of traction.
Figure 26:
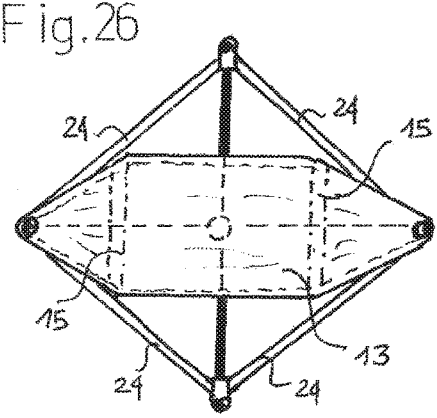
FIG. 26, FIG. 27, FIG. 28, FIG. 29, FIG. 30 show an above perspective of antiprismatic shaped apparatuses and some examples of the surfaces of the backrest in 2-, 3-, 4-, 5-, 6-legged apparatuses.
Figure 27:
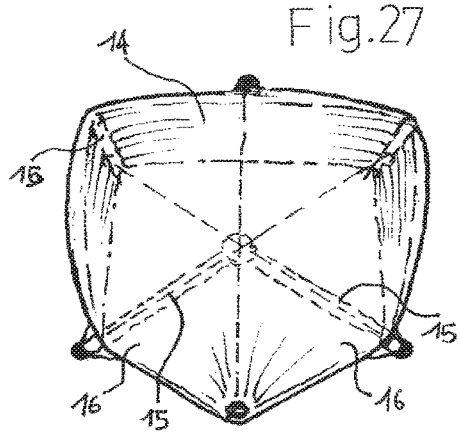
Figure 28:
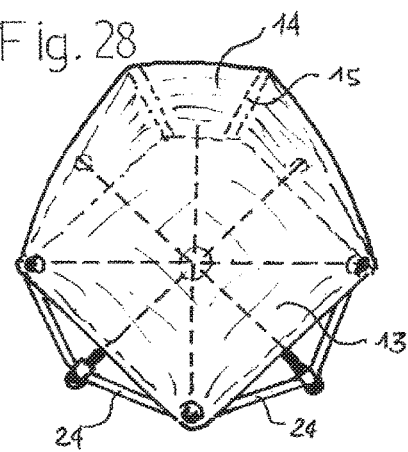
Figure 29:
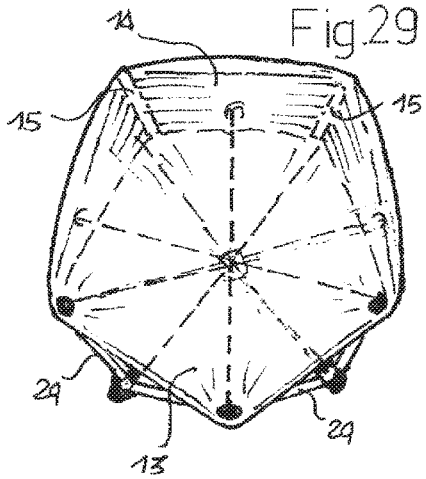
Figure 30:
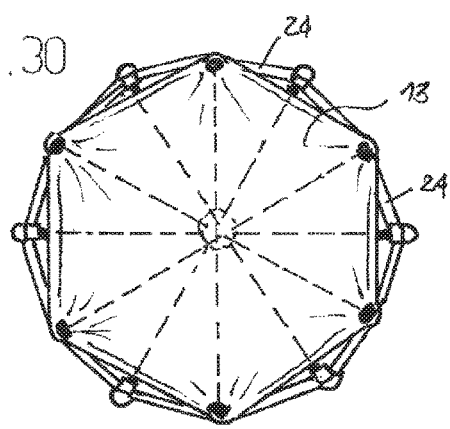
Figure 38:
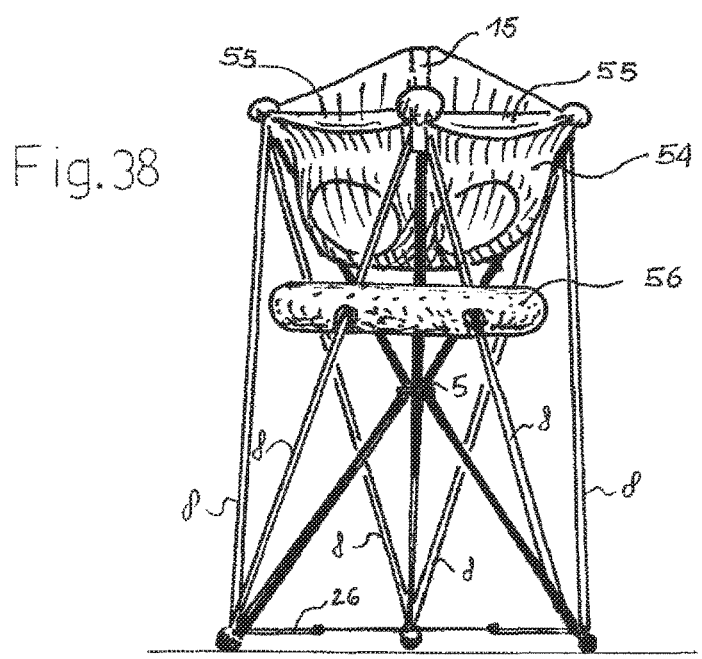
FIG. 38 shows an apparatus with the function of high chair.

An accessory for still further tighten the seats and the tables FIG. 25 concerns a means of traction (52), a rope or a band which surrounds the side traction pillars of the structure and gather them all, fastening them, by an adjustable closing (53). The said means of traction is still further stronger tightened after the opening of the apparatus. An apparatus composed of the same elements of the seat, but conceived as high chair FIG. 38, here the three-legged version is shown. It differs in an upper supporting surface, not stretched, not collaborating but relaxed downwards creating a sack (54) where to put a baby and has two lower openings for the baby's legs. Three tie straps (55) close the upper means of traction, they serves as edge, backrest and support for the sack seat, while in the lower part, on the front tie straps, there is an adjustable support (56) for the baby's feet.

A similar structure, but more expanded FIG. 39 can contain, instead of a seat for children, a conical/pyramidal basin, made of waterproof material, with function as tub or sink (57); lower drain tap is provided (58).

The upper surface of the apparatus with functions of a small table FIG. 40 or high table FIG. 41 is very tensed; the said surface (59) is preferably going to be made of not textile material or in any case few deformable and not elastic, thin and foldable materials. The edges of the said surface are going to be enlarged with external borders (60) in order to reinforce the sides of the table. A pole (61) leaned to the central junction, crosses the plane vertically, and by a linking ring (62) with the same plane it can adjust and compensate the falling downwards of the centre of the supporting surface of the table making flatter the said surface and suitable to sustain the heaviest objects without deforming. Above the pole emerging from the surface (63), multifunction stands can be added: Lamps, bottle and glass holders and so forth.

Figure 42:
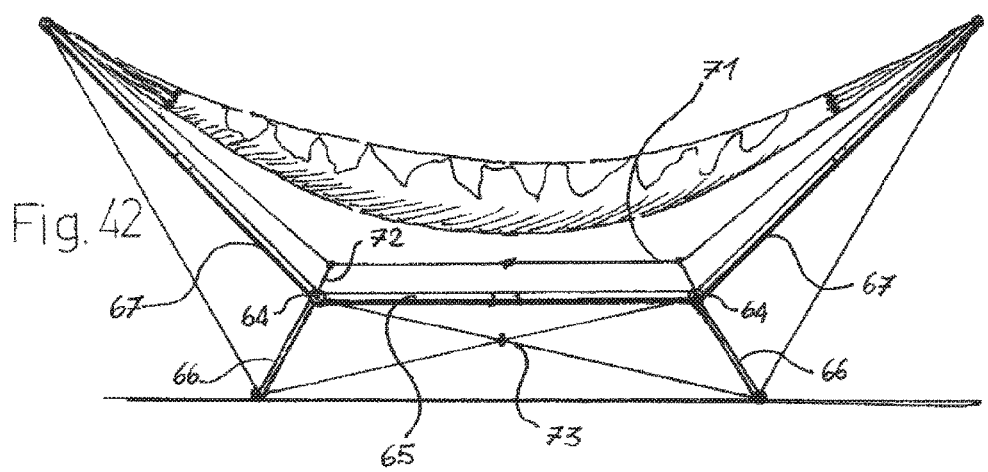
FIG. 42, FIG. 43 show the side perspective and above perspective of a hammock stand apparatus.
Figure 43:
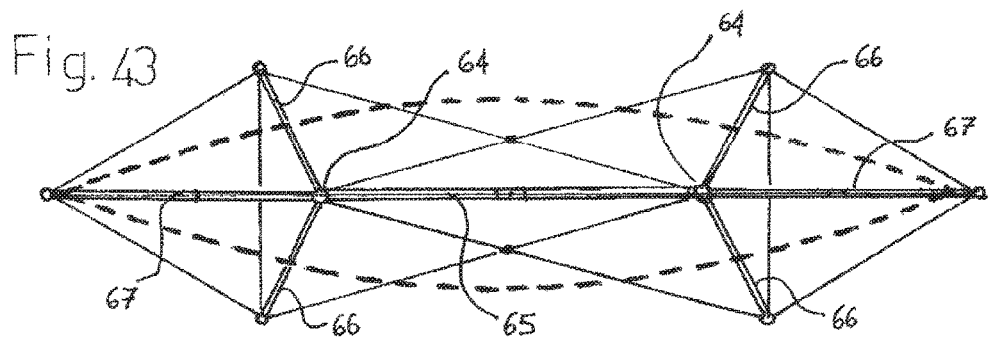
Figure 44:
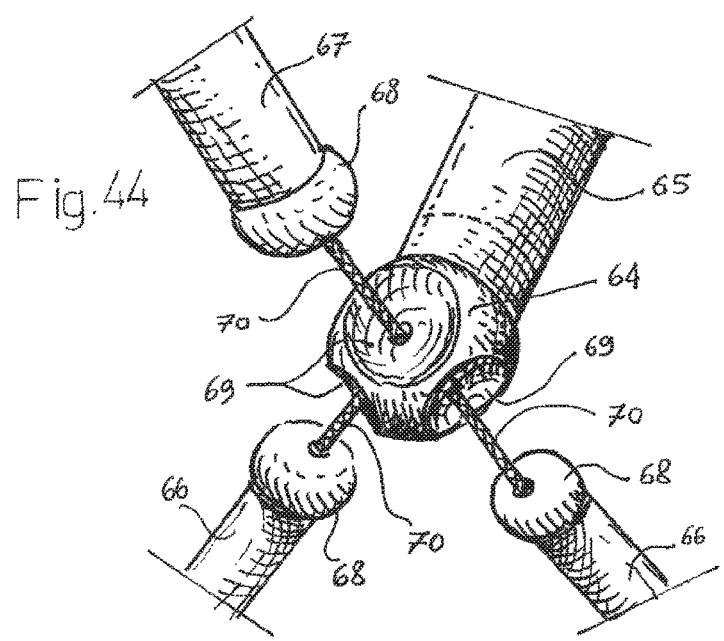
FIG. 44 shows the diagram of a solution of one of the two junctions of the hammock stand structure and camping bed structure.
Figure 45:
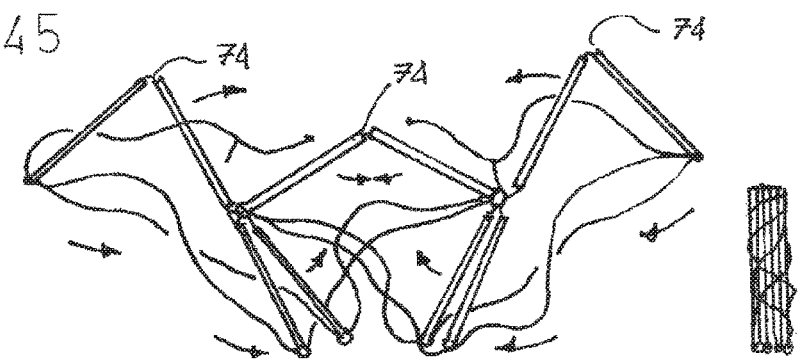
FIG. 45 shows a closing modality of the hammock stand apparatus.

The apparatus shaped as a foldable garden hammock stand FIG. 42 and FIG. 43 is composed of two junction (64), joined to the ends of a horizontal pole (65); from each junction two poles point downwards (66), and a single longer pole point upwards (67); the system of means of traction of this apparatus enables the hammock to support both transversal and longitudinal, strong stresses made by the user. In this solution the junctions (64) are tied to the head of this central and horizontal pole and hinge the other poles, in a more complex manner: two of these heads (68) are rounded and insert in some cap-shaped niches (69), as the femoral head in the hip joint. A string (70) avoid the separation in parts of the structure when the means of traction are unloosened. A further mean of traction (71) is between the extremities of the hammock, joining the base of the two junctions too (72). It is useful for stabilizing the structure of unladen and relaxed hammock and is not tightened. Unlinking or unloosening the lower tie straps (73) or mean of traction (71) it is possible to better fold the structure of the hammock by dividing in two sections the longest poles as in FIG. 45 which can be sectioned into intermediate points (74).

Figure 46:
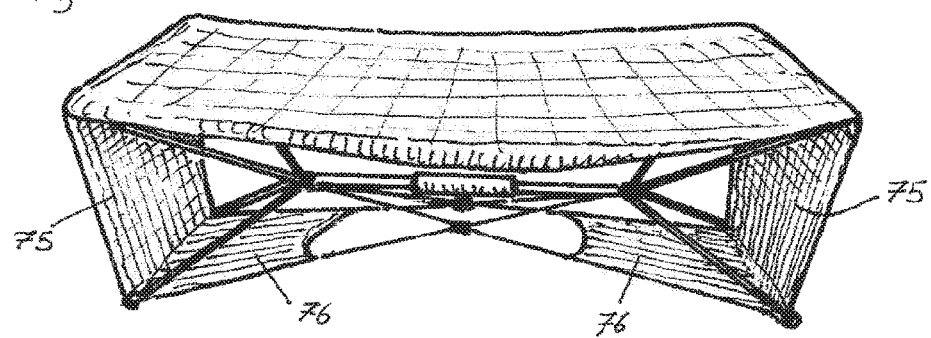
FIG. 46 shows a camping bed/hammock whose means of traction are mainly composed of textile surfaces.
Figure 47:
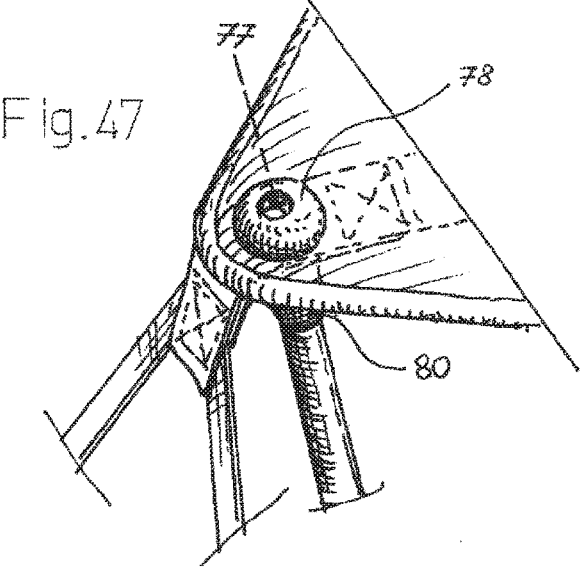
FIG. 47 shows a model of the link among poles, supporting surfaces and side means of traction.

The structure of the camp bed apparatus FIG. 46 is quite similar to the previous one, but the poles that point upwards from the junction are two per each junction of the horizontal pole. It is a camp bed/hammock with a more tightened supporting surface. The said surface is supported by four poles on the vertexes and, as for the seats, it is part of the means of traction of the structure and, in the schematized solution, in the said surface also the shorter sides (75) of the apparatus are extended, and from these side it further extends (76) toward the opposite junction. This structure as well can be divided into fragments and the poles can be halved in two sections. In disassembly phase, the whole piece of material and the tie straps that complete it are disjoint from the frame of poles in order to simplify as much as possible the folding of the apparatus. The links among the supporting surfaces and the poles in all the apparatuses are similar to the link of the poles on the base:—a screw (77) fixes a little cap (78) to the supporting surface, to probable reinforcing straps (79) and to the small cup that surrounds the end of the pole (80).

Figure 48:
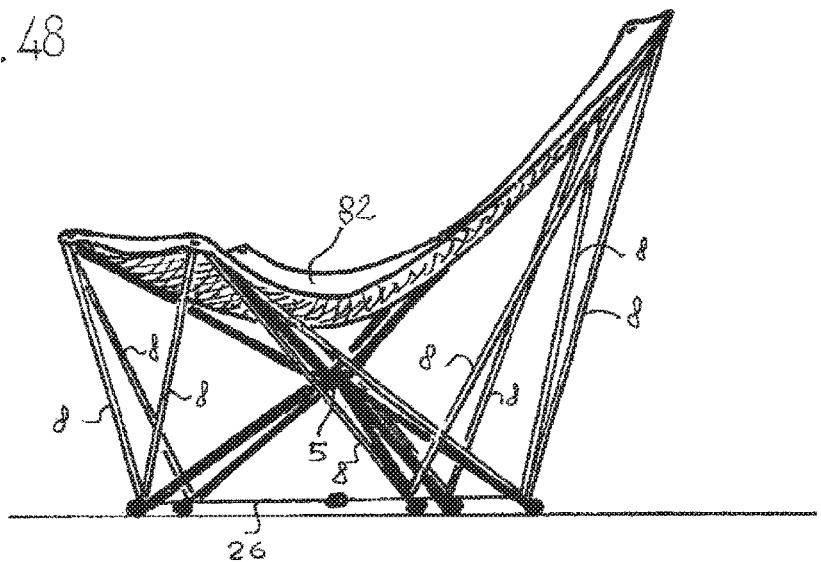
FIG. 48, FIG. 49 show a deckchair wherein the upper supporting surface is tightened and cooperating with the other means only when a person lays on it.
Figure 49:
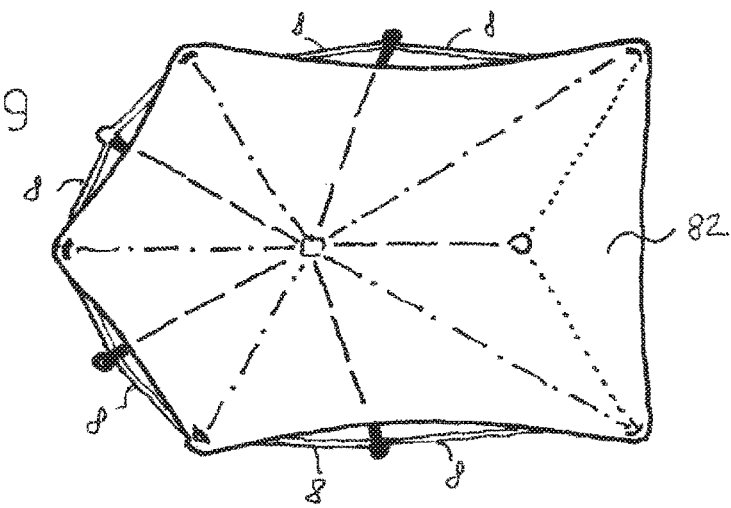

An apparatus with the function of a small deckchair FIGS. 48 and 49, in accordance with the tightening structure subject-matter of the present invention, in which the upper supporting surface is less pre-tightened than the ones of the other apparatuses, but it works as a part of the means of traction only when the users rest on it. Moreover, the same upper supporting surface is not coplanar to the one that is one the ground, because the poles sustaining the portion of the said surface meant to sustain the user's back, are longer. It is a not regular antiprism.

PATENT LITERATURE

PTL1: U.S. Pat. No. 2,139,673 A (DRAPER ARTHUR F.), 13 Dec. 1938 (1938-12-13)

The invention claimed is:

1. A portable and foldable supporting apparatus, said apparatus including:
    an inner structure composed of at least one central junction and a plurality of rods converging to said central junction that hinges them in one end in order for them to be able to rotate around said central junction; said rods branching off from the central junction, some pointing downwards and some pointing upwards; all said rods joining to an outer structure made of traction elements through the ends opposite to the central junction; said inner structure being shaped in order that each rod is joined to said central junction, together with at least other three other rods which, in using and unfolding phase, form the edges of a solid angle whose vertex coincides with the central junction and a base polygon of said solid angle being crossed by the longitudinal axis of the rod which is out of said solid angle;
    said outer structure being composed of a group of flexible traction elements with good tensile strength; said traction elements joining one another and the outer ends of the rods of the inner structure; said traction elements being set in order that each of the ends of the rods is constrained by at least three of said traction elements, and that the angles of said traction elements are arranged so that each outer vertex of said rods result joined to the vertex of a solid angle, while the apparatus is unfolded and in use; the edges of said solid angle being made by said traction elements, and inside the solid angle each rod goes from said vertex crossing an inner part of the polygon of the base of the same solid angle;
    wherein the apparatus is also provided with:
    one or more central junctions linking poles of the inner structure, the perimeter of the junction being surrounded by pins hinging the rods, and the said rods are arranged alternate and cyclically branch off one upwards and one downwards from said central junction, so that they present a specific antiprismatic shape of the apparatus, together with the outer structure made by the traction elements, said antiprismatic shape entailing that an upper polygonal supporting surface is rotated with respect to a base polygon on the ground;
    a group of side traction elements join, through linking elements, the rods pointing upwards to the rods pointing downwards; said traction elements are pointed and angled in order to coincide with the edges of said antiprismatic shape;
    a flexible and foldable supporting surface is joined to the ends of two or more rods, among the ones which branch off from the junctions pointing upwards; wherein said surface works as a part of the traction elements of the outer structure;
    closing/tightening and opening/loosening systems, enabled to section, disjoin and loosen parts of a means of traction, the whole outer structure relaxing and closing the whole apparatus; and
    the means of traction are composed of one or more of the following structure: textile surfaces, not textile surfaces, ropes, bands, plaits, cables, laminas or threads.

2. The apparatus, according to claim 1, wherein said apparatus with function of two-legged stand can be provided with two rods only which branch off from the junction pointing downwards, and only two rods branching off from the junction and pointing toward the upper support, that can be alternatively provided with more rods joined to the central junction and pointing downwards, and an equal or proportional number of rods pointing toward the upper supporting surface so that all the vertexes opposite to the junction of all the rods are set in the same shape of the vertexes of an antiprism.

3. The apparatus according to claim 1, wherein the supporting surfaces of the horizontal support are joined to further extensions of them with function of backrest, or with function of bracing of the last ones; the further surfaces can be horizontally arranged in order to enlarge the supporting surfaces; an apparatus wherein said further surfaces are supported only by sticks joined and coplanar to them; said further surfaces are also preset to fold and align in a single bundle together with the other elements of the structure, during the closure phase.

4. The apparatus, according to claim 1, wherein the structure of the traction elements are closed and tightened by bringing closer the lower ends of the rods pointing downwards, through a group of straps or bands coplanar to the ground and joined to the said extremes, and whose length can be adjusted by sliding proper buckles and/or by sliding the said bands through a central linking ring; the said straps being provided with eyeletted holes to vary the locking position on the lower terminals of the rods and set different height and inclination adjustments of the supporting surface.

5. The apparatus, according to claim 1, wherein the upper and the lower links among the ends of the rods to the structure of the traction elements and to the supporting surface are completed by an end piece that winds the end of the rod which supports said elements, and is joined to a further element in order to join said rods to said traction elements by fastening a screw.

6. The apparatus, according to claim 1, wherein the side traction elements are surrounded by a further horizontal mean of traction which winds them in medial position and can be fastened in a loop around the structure.

7. The apparatus, according to claim 1, wherein the structure of the rods is composed of tubes which join to the pins/hinges of the central junction with linking elements shaped in order to rotate around the said junction that consists in a polygonal ring, whose sides join one another with spheroidal structures built-in in the vertexes of the perimeter of the said ring.

8. The apparatus, according to claim 1, wherein the central junction is separated in two identical elements; the first element hinges a first group of rods pointing downwards and the second element hinges a second group of rods pointing upwards so that the rods intersects rods of said second group; the inner structure that tighten the traction elements is spread by bringing closer the two elements of the junction through a screw-driven tensioner.

9. The apparatus, according to claim 8, wherein the outer structure of the traction elements is composed of a polyhedral surface made of textile materials or similar, whose surfaces are joined one another and to the ends of the poles of the inner structure; the tightening and loosening of said apparatus taking place through the expansion or the contraction of an inner structure of poles divided in said first and second group.

10. An apparatus, according to claim 1, wherein, when opened, the central junction is made in order to pair off one of the rods pointing the supporting surface with one of those pointing the base so that they arrange one on the other so the structure of traction elements of the supporting apparatus is presented as a prism with the side traction elements vertically oriented or with a crisscrossing orientation.

11. The apparatus, according to claim 1, wherein the upper supporting surface cooperates only on the perimeter with the traction elements, or is replaced by other traction elements; therefore it is not tightened, but it collapses inside the structure, tacking different and varied containing shape so as to contain objects and people.

12. The apparatus, according to claim 1, with the function of camping bed wherein the rods converge to two junctions which are placed at the ends of a central horizontal pole; each junction hinges the two poles pointing the upper support and the two pointing downwards; wherein the upper supporting surface surrounds the two sides of the structure too with function of side traction elements, and still further folds under said structure with some detachable means of traction, adjustable and joined to the junctions too.

13. The apparatus, according to claim 1, with function of hammock stand wherein the poles are convergent to two junctions spaced and joined to the ends of a central and horizontal pole; and wherein each junctions works as hinge for two rods pointing downwards and a third one pointing upwards toward an extremity of the surface of the hammock; some detaching points of the traction elements are placed in the lower part of the said apparatus, while an upper tie strap goes from an extremity of the hammock to the opposite one, branching off in two points in order to link the two junctions too.

14. The apparatus, according to claim 1, with function of one-legged support to be used with the user's feet on the ground, wherein three or more rods converge with an end to a central ball joint, from which only one pole branches off pointing downwards; an apparatus wherein the traction elements links the vertexes of the supporting surface, with the end of the rod pointing downwards; furthermore there is a probable adjustable extension of this rod ending with a foot bearing with high adherence.

15. The apparatus, according to claim 1, wherein an upper supporting surface with function of deckchair is strongly tightened completing the traction elements of the structure only when a person lays on it.

16. A portable and foldable supporting apparatus, said apparatus including:
an inner structure composed of at least one central junction and a plurality of rods converging to said central junction that hinges them in one end in order for them to be able to rotate around said central junction; said rods branching off from the central junction, some pointing downwards and some pointing upwards; all said rods joining to an outer structure made of traction elements through the ends opposite to the central junction; said inner structure being shaped in order that each rod is joined to said central junction, together with at least other three other rods which, in using and unfolding phase, form the edges of a solid angle whose vertex coincides with the central junction and a base polygon of said solid angle being crossed by the longitudinal axis of the rod which is out of said solid angle;
said outer structure being composed of a group of flexible traction elements with good tensile strength; said traction elements joining one another or the outer ends of the rods of the inner structure; said traction elements being set in order that each of the ends of the rods is constrained by at least three of said traction elements, and that the angles of said traction elements are arranged so that each outer vertex of said rods result joined to the vertex of a solid angle, while the apparatus is unfolded and in use; the edges of said solid angle being made by said traction elements, and inside the solid angle each rod goes from said vertex crossing an inner part of the polygon of the base of the same solid angle;
wherein the apparatus is also provided with:
one or more central junctions linking poles of the inner structure, the perimeter of the junction being surrounded by pins hinging the rods, and the said rods are arranged alternate and cyclically branch off one upwards and one downwards from said central junction, so that they present a specific antiprismatic shape of the apparatus, together with the outer structure made by the traction elements, said antiprismatic shape entailing that an upper polygonal supporting surface is rotated with respect to a base polygon on the ground;
a group of side traction elements join, through linking elements, the rods pointing upwards to the rods pointing downwards; said traction elements are pointed and angled in order to coincide with the edges of said antiprismatic shape;
a flexible and foldable supporting surface is joined to the ends of two or more rods, among the ones which branch off from the junctions pointing upwards; wherein said surface works as a part of the traction elements of the outer structure;
closing/tightening and opening/loosening systems, enabled to section, disjoin and loosen parts of a means of traction, the whole outer structure relaxing and closing the whole apparatus; and
the means of traction are composed of one or more of the following structure: textile surfaces, not textile surfaces, ropes, bands, plaits, cables, laminas or threads.

* * * * *